United States Patent [19]
Beisch

[11] 4,229,047
[45] Oct. 21, 1980

[54] WHEEL TRIM RETENTION SYSTEM

[75] Inventor: Hans R. Beisch, Amherstburg, Canada

[73] Assignee: Norris Industries, Inc., Ypsilanti, Mich.

[21] Appl. No.: 817,629

[22] Filed: Jul. 21, 1977

[51] Int. Cl.³ ............................................. B60B 7/06
[52] U.S. Cl. ............................ 301/37 P; 301/37 R; 292/175
[58] Field of Search ................. 301/37 R, 37 P, 37 T, 301/37 PB, 37 B, 37 C, 108 R, 108 A; 24/73 B, 73 HC, 73 SB; 292/175, 163; 220/326

[56] References Cited

U.S. PATENT DOCUMENTS

| | | | |
|---|---|---|---|
| 833,900 | 10/1906 | Siller | 292/163 |
| 1,875,906 | 9/1932 | Zarobsey | 301/108 R X |
| 1,940,084 | 12/1933 | Grasso | 292/175 X |
| 2,049,566 | 8/1936 | Knapp | 301/108 R |
| 3,129,470 | 4/1964 | Schneider | 292/175 X |
| 3,703,318 | 11/1972 | Marshall | 301/37 R |

FOREIGN PATENT DOCUMENTS

| | | | |
|---|---|---|---|
| 259969 | 4/1963 | Australia | 24/73 B |
| 735077 | 8/1932 | France | 301/37 R |

Primary Examiner—Charles A. Marmor
Attorney, Agent, or Firm—Harness, Dickey & Pierce

[57] ABSTRACT

A system is described for retaining a wheel trim member in operative relationship to a conventional multi-flanged vehicle wheel which is particularly adapted for use on wheel trim members fabricated from plastic composition. The retention system comprises a cavity or pocket provided in the wheel trim member in which is disposed a clip member and a member for biasing it in a radially outward direction and into engagement with a radially inward facing flange portion of a vehicle wheel. The outer portion of the clip member is provided with teeth which are adapted to bitingly engage the wheel trim member thereby securely retaining the wheel trim member in installed relationship to the vehicle wheel. Cooperating portions are also provided on the clip and within the cavity to limit the radial outward movement of the clip member when the wheel trim member is removed from the vehicle wheel.

34 Claims, 4 Drawing Figures

U.S. Patent
Oct. 21, 1980
4,229,047
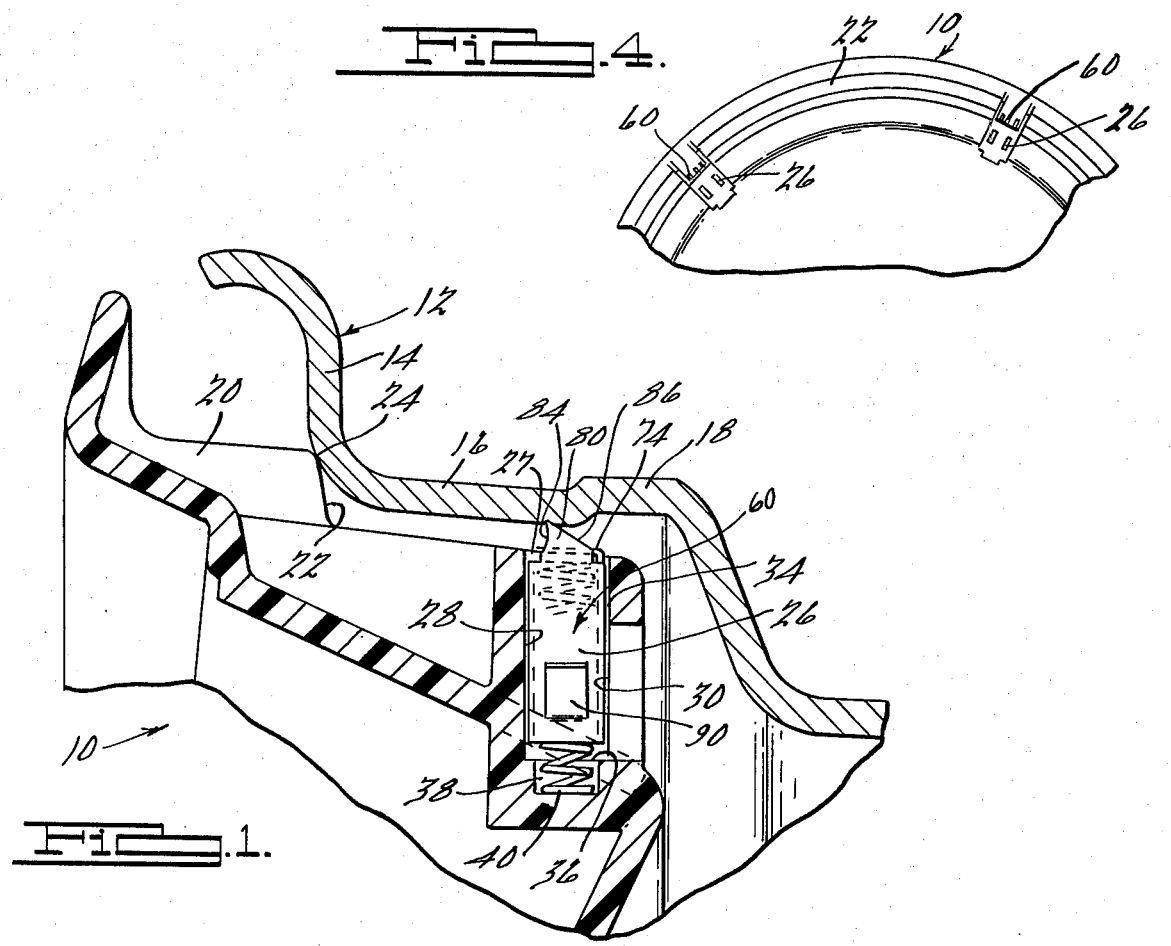
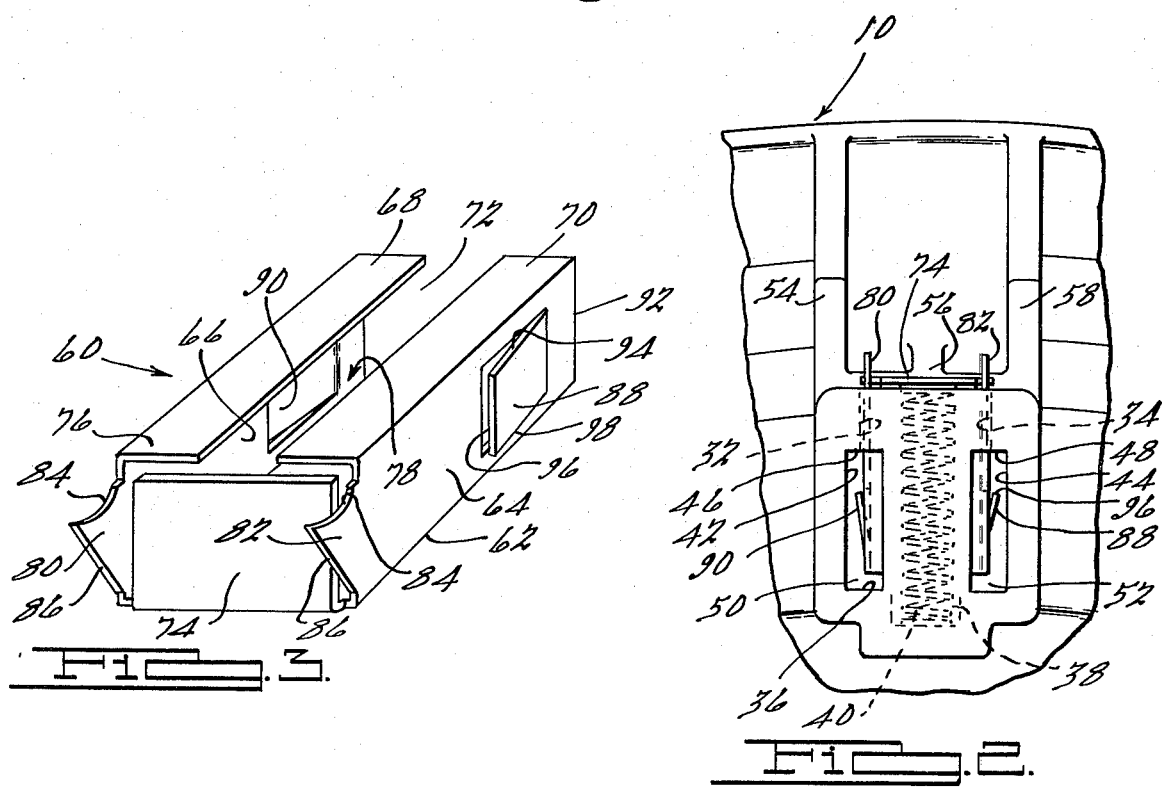

WHEEL TRIM RETENTION SYSTEM

BACKGROUND AND SUMMARY OF THE INVENTION

The present invention relates generally to means for retaining a wheel trim member in operative relationship to a vehicle wheel and more specifically to such retention means which are uniquely adapted for use with wheel trim members fabricated from a plastic composition.

Wheel trim in various forms have long been employed on motor vehicles both for the purpose of protecting the vehicle wheel as well as providing a decorative aesthetically pleasing appearance thereto. One of the major problems associated with such wheel trim has been to design reliable and inexpensive retention means which will securely retain the wheel trim to the vehicle wheel while still allowing it to be easily removed so as to enable the vehicle wheel to be removed from the vehicle. In use, wheels are subject to extreme environments and a great variety of vibrations and other forces which the retention means must be able to withstand and yet still allow the trim to be easily removed. Compounding this problem is the desire to keep the cost of the wheel trim as low as possible, to minimize interference with the aesthetic design of the trim, and to prevent annoying rattling or relative rotation of the wheel and its trim member. These problems are particularly difficult to overcome when a plastic composition material is used to fabricate the wheel trim as the plastic material is not well suited for resisting localized retention stresses generated by conventional retention systems particularly under such adverse conditions as are encountered by the vehicle wheel such as the temperature extremes and other climatic variations.

A wide variety of retention means have been developed in an attempt to satisfactorily resolve this problem both as applied to plastic wheel trim members and such wheel trim fabricated from various types of metals. In one common arrangement, a retention band is provided which has a plurality of retention clips secured thereto which are adapted to engage a portion of the vehicle wheel. Typically, the retention band is secured to the wheel trim at the outer peripheral edge thereof by crimping a portion of the wheel trim thereover. The retention band may also have an inner edge secured to another portion of the wheel trim member. However, this type of an arrangement while possibly producing satisfactory results for a wheel trim member fabricated from a metal material, is less than completely satisfactory when applied to a plastic material as the total retention stress is concentrated at either the outer peripheral area of attachment of the retention band to the wheel trim or merely divided between the inner and outer points of attachment. Various other arrangements are also provided where variously shaped clips may be attached directly to a portion of the wheel trim member or a retention band-like portion integrally formed with the wheel trim member.

A common problem presented by these various configurations is that there exist a rigid connection between the wheel trim member and the clip or retention band means thus allowing various vibrational forces encountered by the wheel to be transmitted directly through the engagement between the vehicle wheel and the clip to the wheel trim member. When the wheel trim member is fabricated from a plastic composition, the continuous subjecting thereof to such vibrations may cause breaking or other deterioration within a relatively short period of time particularly during periods of low temperature.

Accordingly, the present invention provides an improved wheel trim retention means particularly adapted for use with wheel trim fabricated from plastic compositions which is designed to minimize the transmission of wheel originating vibrations to the trim member while still securely and removably retaining the wheel trim in position on the vehicle wheel. Also, the retention force exerted by the present invention is directly dependent upon the strength of the biasing means associated therewith and therefore may be easily varied between different wheel trim members so as to facilitate retention means cost optimization for each type of wheel trim while still achieving the advantage of a standardized clip member. Further, the retention means of the present invention eliminates the need for a retention band which bands were typically fabricated from a metal material thus allowing for reduction of the overall weight of the wheel trim member. This weight reduction is extremely important particularly in view of the pressing governmental demands to reduce vehicle gasoline consumption. Further, as the weight of the wheel trim member represents unsprung weight, it has a significant effect upon ride performance of the vehicle as well as the required strength of the various suspension components. Also, the retention clip of the present invention may be easily removed and replaced as may the biasing means associated therewith thus enabling a vehicle owner to easily repair the wheel trim member in the event a portion of the retention means provided thereon becomes broken.

Additional advantages and features of the present invention will become apparent from the subsequent description taken in conjunction with the claims and drawings appended hereto.

BRIEF DESCRIPTION OF THE DRAWINGS

FIG. 1 is an enlarged sectional view of a portion of a vehicle wheel and associated trim member illustrated in operative relationship thereto, the section being taken along a radial plane lying parallel to the axis of rotation;

FIG. 2 is an enlarged view of a clip member and associated portion of the wheel trim member as viewed looking outwardly along the rotational axis thereof;

FIG. 3 is an enlarged perspective view of a clip member in accordance with the present invention which forms a part of the retention means of the present invention illustrated in FIGS. 1 and 2; and FIG. 4 is a view of a portion of a vehicle wheel trim member as viewed looking outwardly along the rotational axis of the vehicle wheel.

DESCRIPTION OF THE PREFERRED EMBODIMENT

Referring now to FIG. 1, a wheel trim member 10 is illustrated in operative relationship to a portion of a conventional multiflanged vehicle wheel 12. Vehicle wheel 12 is of conventional construction including a generally radially extending flange portion 14 adjacent the outer peripheral edge thereof which merges with a generally axially inwardly extending flange portion 16 at its radially inner edge. A safety groove 18 is also provided at the axially inner edge of generally axially inwardly extending flange portion 16.

Wheel trim member 10, which may be in the form of either a wheel cover or a trim ring, is preferably fabricated from a plastic composition material such as acrylonitril butadyene styrene (ABS) by any suitable forming process such as an injection molding process. Wheel trim member 10 may have any of a wide variety of cross sectional shapes suitable to provide a decorative accent to the vehicle wheel but will generally be provided with an axially inwardly extending flange portion 20 adjacent the peripheral edge thereof which merges with a radially inwardly extending flange portion 22 at its axially inner edge thereby forming a shoulder portion 24 which is adapted to engage radially extending flange portion 14 of vehicle wheel 12 so as to limit the axial inward movement of wheel trim 10 with respect thereto. It should be noted that flange portions 20 and 22 as well as the shoulder portion 24 may be either in the form of a plurality of discrete elements spaced around the circumference of trim member 10 or extend continuously around the circumference thereof.

Wheel trim member 10 also has a radially elongated generally rectangular shaped cavity 26 which has a radially outwardly facing opening 27. Cavity 26 is generally rectangular in shape being defined by axially outer wall 28, axially inner wall 30, circumferentially spaced opposing sidewalls 32 and 34, and a radially inwardly disposed backwall 36. A radially inwardly extending recess portion 38 is provided in backwall 36 of cavity 26 which recess is adapted to receive biasing means in the form of a helical coil spring 40. Sidewalls 32 and 34 are each provided with a notched portion 42 and 44 respectively defined in part by oppositely extending radially inwardly facing shoulder portions 46 and 48 respectively. A pair of radially elongated relatively narrow cut out portions 50 and 52 are provided in axially inner wall 30 which are positioned so as to afford access therethrough to notched portions 42 and 44. A plurality of reinforcing flange members 54, 56, and 58 may also be provided extending generally axially outward from the radially outer end of outer wall 28 which serve to reinforce the cavity defining structure.

An elongated clip member 60 is movably disposed within cavity 26 and is urged in a radially outward direction by helical coil spring biasing means 40. As best seen with reference to FIG. 3, clip member 60 has an elongated body portion of a generally rectangular cross sectional shape including a bottom wall 62, upwardly extending spaced sidewall portions 64 and 66, and a pair of inwardly extending spaced flange portions 68 and 70 which define a top wall having a longitudinally extending opening 72 provided therein. A flange portion 74 is provided at and partially closes off one end 76 of clip member 60 and along with bottom wall 62, sidewalls 64 and 66, and top flanges 68 and 70 defines a partially enclosed area 78. A pair of tooth projections 80 and 82 are provided on sidewalls 64 and 66 and project outwardly from end 76 of clip member 60. Each of tooth projections 80 and 82 are integrally formed with clip member 60 and are defined by a generally arcuate shaped upper edge 84 and an inclined lower edge portion 86. Along each of sidewalls 64 and 66 of clip member 60 longitudinal movement limiting members in the form of generally rectangular shaped tab portions 88 and 90 are provided adjacent end 92 of clip member 60. Tab portions 88 may be formed by slitting sidewall 64 along edges 94, 96, and 98 and thereafter bending the tab portion outward so as to cause it to diverge from sidewall 64 slightly toward end 76 of clip member 60. Tab portion 90 may be formed in a substantially identical manner. Preferably, clip member 60 will be fabricated from a suitable material such as steel in strip form by stamping the developed form and thereafter folding portions to obtain the desired shape as illustrated in FIG. 3.

In order to assemble the retention system of the present invention, helical coil spring 40 will first be inserted into cavity 26 through opening 27 thereof and positioned with the radially inner end thereof seated in recess 38 formed in backwall 36 of trim member 10. Thereafter, clip member 60 will be similarly inserted into cavity 26 through opening 28 with arcuate edge portions 84 of tooth projections 80 and 82 respectively facing axially outward and helical coil spring 40 extending through open end 72 of clip member 60 through area 78 and into engagement with the inner surface of flange portion 74. Thus, as clip member 60 is moved radially inward into cavity 26, helical coil spring 40 will be compressed between flange portion 74 and recess 38 so as to urge clip member 60 in a radially outward direction. Also, as clip member 60 is moved further radially inward, tab portions 88 and 90 will be compressed inward by engagement with opposed sidewalls 32 and 34 until they reach respective notched portions 42 and 44 whereupon they will be released to their relaxed slightly diverging position. Thus, spring 40 will urge clip member 60 radially outward with respect to cavity 26 causing edge portions 96 of tab portions 88 and 90 to engage respective shoulder portions 46 and 48 thereby limiting the radially outward longitudinal movement of clip member 60 so as to maintain the retention means in assembled relationship when wheel trim 10 is removed from vehicle wheel 12. It should be noted that shoulders 46 and 48 will be positioned relative to edges 96 of tab portions 88 and 90 so as to insure a spaced apart relationship when wheel trim 10 is installed upon vehicle wheel 12 so as to insure a maximum retention effort is exerted by spring 40.

As illustrated in FIG. 4, wheel trim 10 will preferably have a plurality of cavities 26 formed therein adjacent the outer circumference and spaced therearound the specific number being determined by various factors such as the weight of the wheel trim member and the degree of retention force exerted by each clip member. It should also be noted that the retention force exerted by each clip member may be easily varied between wheel trim members by use of helical compression springs of different rates.

In order to install a wheel trim having retention means in accordance with the present invention on a vehicle wheel, one need merely position the trim member on the vehicle wheel and exert an axially inward force thereon. Edges 86 of respective tooth projections 80 and 82 will initially engage vehicle wheel 12 at the juncture of flange portions 14 and 16 and the axially directed force will cause clip member 60 to move radially inward into cavity 26 and tooth projections to move axially inward along flange portion 16. Tooth projections will thereafter exert a biting retention force on flange portion 16 so as to prevent axial outward movement of wheel trim 10. It should be noted that shoulders 46 and 48 will be positioned relative to edges 96 of tab portions 88 and 90 so as to insure that bottom portion 62 of clip member 60 will not engage flange portion 14 of vehicle wheel 12 as wheel trim 10 is installed thereon.

Thus, as is apparent, there is disclosed herein a unique retention means particularly adapted for use in securely retaining wheel trim members fabricated from plastic in operative relationship to a vehicle wheel. Further, the retention means of the present invention may be easily adapted to provide appropriate retention force for any weight wheel trim member by merely employing different strength spring biasing members.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A wheel trim for a vehicle wheel comprising
   a trim member;
   at least one radially elongated radially outwardly opening cavity provided in said trim member;
   clip means movably disposed within said cavity, said clip means including radially elongated spaced sidewalls defining a partially enclosed area and having projections cooperating with sidewall portions of said cavity so as to limit movement of said clip with respect to said cavity;
   a toothed portion provided on said clip means;
   flange means positioned between said sidewalls; and
   biasing means engaging said flange means and urging said clip means radially outwardly from said cavity through said opening and urging said toothed portion into biting engagement with a portion of a vehicle wheel when said trim member is installed thereon so as to retain said trim member in position thereon.

2. A wheel trim as set forth in claim 1 wherein said projections operate to limit the movement of said clip member in a radially outwardly direction.

3. A wheel trim as set forth in claim 2 wherein said cavity has shoulder portions provided therein, said projections engaging said shoulder portions to limit radial outward movement of said clip means.

4. A wheel trim as set forth in claim 1 wherein said toothed portion is integrally formed with at least one of said spaced sidewalls and projects radially outwardly therefrom.

5. A wheel trim as set forth in claim 1 wherein said flange means is disposed at and partially encloses the radially outer end of said clip member.

6. A wheel trim as set forth in claim 5 wherein said clip means further includes a second toothed portion, said toothed portions projecting radially outward from the radially outer end of each of said spaced sidewalls and said flange means is disposed therebetween.

7. A wheel trim as set forth in claim 6 wherein said clip means further includes means for engaging a portion of said vehicle wheel so as to cause said clip means to move radially inwardly with respect to said cavity as said wheel trim is moved axially inwardly with respect to said vehicle wheel.

8. A wheel trim as set forth in claim 7 wherein each of said engaging means includes an axially and radially outwardly extending edge portion, said edge portion partially defining said toothed portion and being operative to cause said clip means to move radially inwardly into said cavity as said wheel trim is installed on said vehicle wheel.

9. A wheel trim as set forth in claim 6 wherein said trim member includes a plurality of said cavities spaced around the circumference thereof and clip means disposed within each of said cavities.

10. A wheel trim as set forth in claim 9 wherein each of said cavities are positioned on said trim member so as to place said opening adjacent to and facing a generally radially inwardly facing flange portion of said vehicle wheel when said wheel trim is installed in operative relationship thereto.

11. A wheel trim as set forth in claim 9 wherein said trim member is fabricated from a plastic material.

12. A wheel trim as set forth in claim 9 wherein said trim member is a wheel cover.

13. A wheel trim as set forth in claim 9 wherein said trim member is a trim ring.

14. A wheel trim as set forth in claim 5 wherein said cavity includes a recessed portion in an end opposite said opening, said biasing means having a radially inner end disposed in said recess.

15. A wheel trim as set forth in claim 14 wherein said biasing means comprises a helical coil spring.

16. A wheel trim for a vehicle wheel comprising:
    a trim member;
    at least one radially elongated radially outwardly opening cavity provided in said trim member;
    a clip member movably disposed within said cavity, said clip member including an elongated body portion, an integrally formed flange portion at one end of said body portion, a pair of integral spaced tooth portions adjacent said flange portion adapted to bitingly engage a portion of said vehicle wheel, and integral movement limiting means for limiting movement of said clip means in a radially outward direction; and
    biasing means extending between a portion of said cavity and said flange portion, and being operative to urge said movement limiting means into engagement with a portion of said cavity.

17. A wheel trim as set forth in claim 16 wherein said movement limiting means comprises projections provided on said clip member, said projections cooperating with portions of said cavity to limit said outward radial movement of said clip member.

18. A wheel trim as set forth in claim 17 wherein said cavity has shoulder portions provided therein, said projections engaging said shoulder portions to limit radial outward movement of said clip means.

19. A wheel trim as set forth in claim 18 wherein said cavity further includes a recess in a radially inner wall portion thereof, one end of said biasing means being received therein.

20. A wheel trim as set forth in claim 19 wherein said biasing means is a helical coil spring.

21. A wheel trim as set forth in claim 19 wherein said cavity further includes an axially inwardly facing opening, said opening being positioned so as to afford access to said projections on said clip member.

22. A wheel trim as set forth in claim 19 wherein said toothed portions are each defined by intersecting arcuate and beveled edge portions.

23. A wheel trim as set forth in claim 22 wherein said beveled edge portion is positioned so as to engage a portion of said vehicle wheel and cause radially inward movement of said clip member as said wheel trim is installed thereon.

24. A wheel trim retention clip for securing a wheel trim to a vehicle wheel, said retention clip comprising:

an elongated body portion having sidewalls;

a flange portion integral with said body portion and positioned between said sidewalls;

a toothed portion integral with said body portion, said toothed portion being adapted to bitingly engage a portion of said vehicle wheel when said clip is assembled to said wheel trim and said wheel trim is installed on a vehicle wheel; and movement limiting means integrally provided on said sidewalls, said movement limiting means being elastically deformable so as to enable said clip to be inserted within a cavity provided in said wheel trim, said movement limiting means thereafter being adapted to cooperate with stop means provided in said cavity to limit movement of said clip in an outward direction with respect to said cavity and said flange portion being positioned on said body portion so as to engage biasing means urging said toothed portion into biting engagement with said vehicle wheel when said clip is installed in said wheel trim and said wheel trim is assembled to said vehicle wheel.

25. A retention clip as set forth in claim 24 wherein said movement limiting means is adapted to cooperate with a portion of said wheel trim to limit movement in a radial outward direction.

26. A retention clip as set forth in claim 25 wherein said movement limiting means comprises at least one outwardly protruding tab portion.

27. A retention clip as set forth in claim 26 wherein said tab portion is intermediate the ends of said body portion.

28. A retention clip as set forth in claim 27 wherein said body portion has a generally rectangular cross section and said movement limiting means comprises an outwardly projecting tab portion provided in each of two parallel sidewall portions thereof.

29. A retention clip as set forth in claim 24 wherein said flange portion is disposed at one end of said body portion and cooperates therewith to define a substantially enclosed area therein adapted to receive said biasing means.

30. A retention clip as set forth in claim 29 wherein said toothed portion includes a tooth projecting outwardly adjacent said flange portion.

31. A retention clip as set forth in claim 30 wherein said tooth is defined by intersecting arcuate and beveled edges.

32. A retention clip as set forth in claim 31 wherein said toothed portion includes a second tooth laterally spaced from said tooth and defined by second intersecting arcuate and beveled edges.

33. A retention clip as set forth in claim 24 wherein said toothed portion comprises a pair of spaced longitudinally extending teeth each of said teeth being defined by the insertion of an arcuate edge and a beveled edge.

34. A wheel trim for a vehicle wheel comprising:

a trim member;

means defining a plurality of integrally formed radially outwardly opening elongated cavities in said trim member, each of said cavities having stop means provided therein;

a plurality of retention clips, one of said plurality of retention clips being movably disposed in each of said cavities, each of said retention clips including an elongated body portion having sidewalls;

a flange portion integral with said body portion and positioned between said sidewalls;

a toothed portion integral with said body portion; and movement limiting means integrally formed on said sidewalls, said body portion being adapted to be movably disposed in and cooperate with said cavity provided in said wheel trim so as to guide longitudinal movement of said clip in a radial direction with respect to said wheel trim, said movement limiting means being elastically deformable so as to facilitate insertion of said clip into said cavity and thereafter cooperating with said stop means of said cavity to limit radially outward movement of said clip and said flange portion being positioned on said body portion so as to engage biasing means urging said toothed portion into biting engagement with said vehicle wheel when said wheel trim is installed on said vehicle wheel.

* * * * *